US012643417B2

(12) United States Patent
Devaraj et al.

(10) Patent No.: US 12,643,417 B2
(45) Date of Patent: Jun. 2, 2026

(54) ELECTRIC DRIVE UNIT WITH DISCONNECT CLUTCHES AND ELECTRIC DRIVE UNIT OPERATING METHOD

(71) Applicant: Dana Automotive Systems Group, LLC, Maumee, OH (US)

(72) Inventors: Gowrisankar Devaraj, Leamington Spa (GB); Cody Ott, Ida, MI (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 120 days.

(21) Appl. No.: 18/404,572

(22) Filed: Jan. 4, 2024

(65) Prior Publication Data

US 2025/0222785 A1     Jul. 10, 2025

(51) Int. Cl.
*B60K 17/02* (2006.01)
*B60K 1/02* (2006.01)
*B60L 15/20* (2006.01)

(52) U.S. Cl.
CPC ............ *B60L 15/2036* (2013.01); *B60K 1/02* (2013.01); *B60K 17/02* (2013.01); *B60L 2240/461* (2013.01); *B60L 2240/463* (2013.01); *B60L 2240/50* (2013.01)

(58) Field of Classification Search
CPC ........... B60L 15/2036; B60L 2240/461; B60L 2240/463; B60L 2240/50; B60K 1/02; B60K 17/02
See application file for complete search history.

(56) References Cited

U.S. PATENT DOCUMENTS

| | | | |
|---|---|---|---|
| 3,799,284 A | * | 3/1974 | Hender .................... H02K 7/14 |
| | | | 903/910 |
| 8,641,568 B2 | | 2/2014 | Knoblauch et al. |
| 10,377,221 B2 | | 8/2019 | Holmes et al. |
| 10,876,628 B2 | | 12/2020 | Gruber et al. |
| 11,192,436 B1 | | 12/2021 | Puiu et al. |
| 11,390,160 B2 | | 7/2022 | McBride et al. |
| 11,760,195 B2 | | 9/2023 | Perry et al. |
| 2013/0030636 A1 | * | 1/2013 | Sugata ................. B60K 7/0007 |
| | | | 701/22 |

(Continued)

FOREIGN PATENT DOCUMENTS

| | | | |
|---|---|---|---|
| DE | 102011080236 A1 | 2/2013 | |
| DE | 102011086062 A1 * | 5/2013 | ............. B60K 23/04 |

(Continued)

OTHER PUBLICATIONS

Simon, R. et al., "Electric Axle With Multiple Electric Machines and Locking Clutch," U.S. Appl. No. 18/048,366, filed Oct. 20, 2022, 26 pages.

*Primary Examiner* — Tisha D Lewis
(74) *Attorney, Agent, or Firm* — McCoy Russell LLP

(57) ABSTRACT

Systems and methods for an electric drive unit. The electric drive unit includes, in one example, a first electric machine rotationally coupled to a first drive wheel via a first gear train and a second electric machine rotationally coupled to a second drive wheel via a second gear train. The electric drive unit further includes a disconnect clutch that is configured to selectively rotationally couple the first electric machine and the second electric machine and a park lock assembly that is coupled to one of the first gear train and the second gear train and is configured to inhibit rotation of the corresponding gear train.

15 Claims, 6 Drawing Sheets

(56) References Cited

U.S. PATENT DOCUMENTS

| | | | |
|---|---|---|---|
| 2014/0144718 A1 | 5/2014 | Mair et al. | |
| 2018/0236982 A1* | 8/2018 | Yano ........................ | B60T 1/005 |
| 2024/0131923 A1* | 4/2024 | Sigmon .................. | B60K 17/02 |

FOREIGN PATENT DOCUMENTS

| | | | | |
|---|---|---|---|---|
| JP | 3196593 B2 * | 8/2001 | .............. | B60L 15/20 |
| WO | 2018001476 A1 | 1/2018 | | |

* cited by examiner

400

| Operating Mode | Disconnect Clutch (216) | Disconnect Clutch (227) | Disconnect Clutch (229) | Park Lock Assembly (257) | Left Drive | Right Drive | Drive Condition |
|---|---|---|---|---|---|---|---|
| Drive Mode (a) | Engaged | Engaged | Engaged | Disengaged | Drive | Drive | Hill climb, low traction environment, etc. |
| Drive Mode (b) | Engaged | Engaged | Disengaged | Disengaged | Drive | Drive | Cornering |
| Drive Mode (c) | Engaged | Engaged | Engaged | Disengaged | Drive | Generator | Load sharing during a cruising and straight driving condition |
| Drive Mode (d) | Disengaged | Disengaged | Disengaged | Disengaged | Coasting | Coasting | Over speeding |
| Park Mode | Engaged | Engaged | Engaged | Engaged | Park | Park | Null speed condition |

FIG. 4

ELECTRIC DRIVE UNIT WITH DISCONNECT CLUTCHES AND ELECTRIC DRIVE UNIT OPERATING METHOD

TECHNICAL FIELD

The present disclosure relates to an electric drive unit for a vehicle powertrain. In particular, the disclosure relates to an electric drive unit with multiple electric machines and disconnect clutches.

BACKGROUND AND SUMMARY

Electric drives have been utilized in certain vehicles as the transportation sector moves toward powertrain electrification. Some electric drives include two motors which generate motive power. Certain electric drives have made use of a dual-motor architecture where the motors independently provide motive power to drive wheels. Park lock systems have been used in some electric drives to inhibit vehicle movement.

U.S. Pat. No. 11,192,436 B1 to Puiu et al. discloses an electric drive unit with two motors which are attached to a differential that is coupled to front and rear drive wheels. In Puiu's system, a parking gear is mounted on the differential in an attempt to provide park lock functionality.

The inventors have recognized several drawbacks with Puiu's park lock system and other park lock systems. Puiu's park lock system is constrained to use in an all-wheel drive vehicle. Further, the amount of torque experienced by Puiu's parking gear, when engaged, may be higher than desirable for certain powertrain architectures. Other electric powertrains have made use of two drive units which independently provide power to opposing drive wheels. In some of these dual electric drive architectures, two park lock devices are used. However, using two park lock devices may cause wheel slip until the parking gears and pawls find their position to engage the left and right drive units. Further, when two park lock devices are used, additional control schemes and processing resources may also be demanded, further increasing system complexity. Further, some electric drive units have experienced back electromotive force (EMF) during certain operating conditions, such as over-speeding. More generally, some electric drive units have been unable to achieve mechanical stability, performance, range management, and/or vehicle energy management targets for certain vehicle platforms.

Facing the abovementioned issues, the inventors developed an electric drive unit to at least partially resolve the issues. The electric drive unit includes, in one example, a first electric machine rotationally coupled to a first drive wheel via a first gear train and a second electric machine rotationally coupled to a second drive wheel via a second gear train. The electric drive unit further includes a first disconnect clutch configured to, in an engaged configuration, rotationally couple the first electric machine and the second electric machine. The electric drive unit even further includes a controller that engages the first disconnect clutch and operates one of the first and second electric machines in a generator mode while the other electric machine is operated in a drive mode. In this way, energy is conserved during certain operating conditions to increase powertrain efficiency and range.

Still further in one example, the electric drive unit may further include a second disconnect clutch positioned in the first gear train and a third disconnect clutch positioned in the second gear train. In such an example, the controller may be configured to, during a coasting condition, disengage the second disconnect clutch and the third disconnect clutch. In this way, back EMF is reduced or avoided in some instances, thereby enhancing drive unit performance.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 4 shows a table that indicates different modes of operation for the electric drive unit, depicted in FIG. 2.

DETAILED DESCRIPTION

A multi-motor electric drive unit which achieves efficient park lock functionality and enhanced tractive performance is described herein. To realize these features the electric drive unit includes a first disconnect clutch which is designed to selectively couple two traction motors which are rotationally connected to separate drive wheels via gear trains. The first disconnect clutch is able to be engaged to increase tractive performance (e.g., when experiencing steep grades, diminished traction terrain, etc.) and to be disengaged when wheel speed differentiation is desired (e.g., during cornering). Thus, the electric drive unit is able to have torque vectoring capabilities during certain conditions and enhanced power as well as load sharing capabilities during other conditions such as during launch, hill climbing, when encountering variable traction terrain (e.g., rocky, sandy, and/or muddy off-road terrain), and the like. The electric drive unit may further include additional disconnect clutches positioned in each of the gear trains. When multiple disconnect devices are used in the electric drive unit, the following achievements can be leveraged. Making use of a disconnect clutch that connects the left and right electric machines, enables power sharing when the power demand is low on straight driving so that one electric machine acts as driver and other acts as a generator. In this way, vehicle drive range is increased. While cruising in the slope, overspeeding of the electric machines can cause back electromotive force (EMF) generation. As such, the gear train disconnect devices may be opened such that the power flow through the gear trains is inhibited to avoid bursting or other degrading conditions. A park lock assembly may be positioned in one of the gear trains of the electric drive unit. To mechanically lock the electric drive unit, the park lock assembly and the disconnect clutches are jointly engaged. In this way, a single park lock assembly may be used to lock the opposing drive wheels, if desired. Consequently, the use of dual park lock systems can be avoided and the space efficiency and complexity of the electric axle is reduced by avoiding redundant park lock mechanisms and the control strategy for both park lock mechanisms, if wanted. Specifically, the park lock assembly may make the drive unit more stable when parked off-road and/or on a slope and allows the park lock assembly to avoid over or under roll that dual park lock systems can experience.

Figure 1:
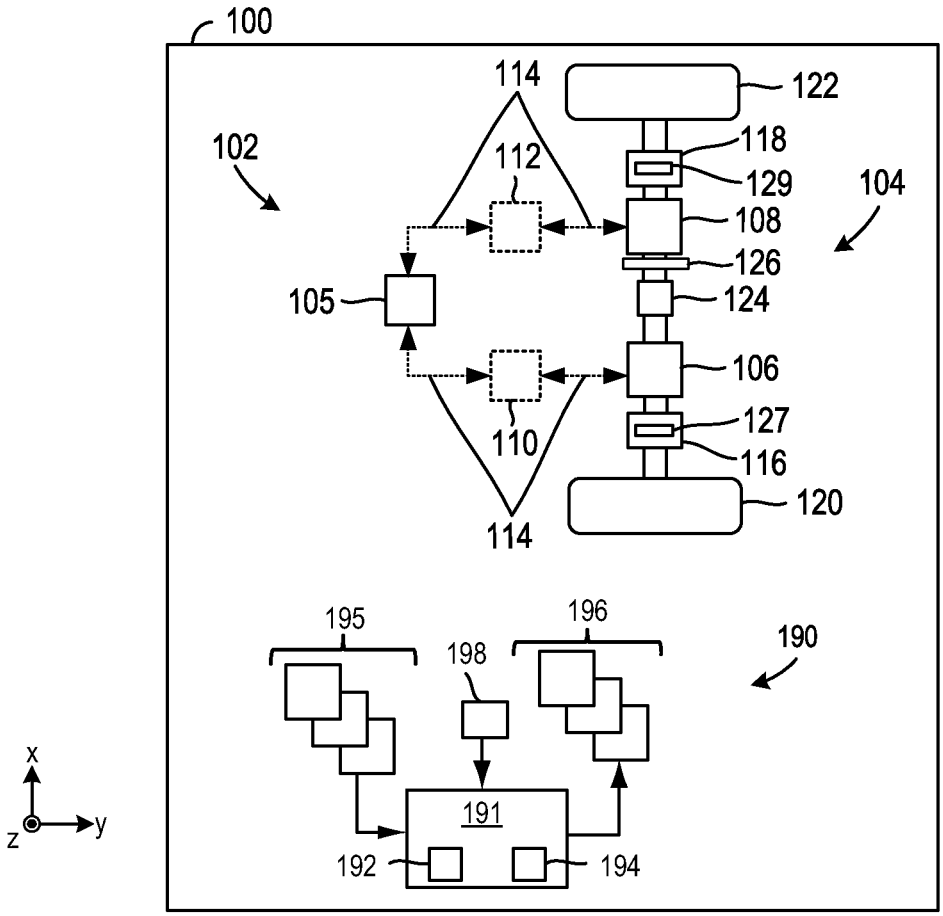
FIG. 1 shows a schematic depiction of an electric powertrain in a vehicle.

FIG. 1 shows a schematic illustration of an electric vehicle (EV) 100. The vehicle may be a passenger vehicle, a commercial vehicle, an on-highway vehicle, or an off-highway vehicle, in different examples.

The EV 100 includes a powertrain 102 which includes an electric drive unit 104 (e.g., electric axle). The EV may be an all-electric vehicle (e.g., a battery electric vehicle (BEV)), in one example, or a hybrid electric vehicle (HEV) with an internal combustion engine, in another example. In the HEV example, an axle powered by an internal combustion engine may be used in the vehicle and/or the ICE may be utilized to recharge one or more traction energy storage device(s) 105 (e.g., one or more traction batteries, capacitors, and the like).

The electric drive unit 104 includes a first electric machine 106 and a second electric machine 108. To elaborate, these electric machines 106, 108 may specifically be traction motors. The electric machines may be multi-phase alternating current (AC) machines, in one specific example. However, in other examples, the electric machines may be direct current (DC) machines.

In the illustrated example, a first inverter 110 and a second inverter 112 are electrically coupled to the first electric machine 106 and the second electric machine 108. The inverters 110, 112 convert DC power to AC power and vice versa. However, in alternate examples, one inverter may be used to electrically power both electric machines or the inverters may be omitted if DC electric machines are utilized in the powertrain.

The inverters 110, 112 may receive electric energy from the one or more energy storage device(s) 105 (e.g., traction batteries, capacitors, fuel cells, combinations thereof, and the like). Arrows 114 signify the electric energy transfer between the electric machines 106, 108, the inverters 110, 112, and the energy storage device(s) 105 that may occur during different modes of system operation. In one example, the inverters 110, 112 may each be electrically coupled to the one or more energy storage device(s). However, in other examples, the inverters 110, 112 may be electrically coupled to different energy storage device(s).

The electric machines 106, 108 are each configured to operate in a drive mode where the machine generate motive power. The electric machines 106, 108 may also be operated in regeneration modes where the machine functions as an electrical power generator. In the regeneration mode, electrical power may be transferred from the electric machine to the energy storage device(s) 105 and/or other electrical power consuming component in the vehicle.

The first and second electric machines 106, 108 are rotationally coupled to a first gear train 116 and a second gear train 118, respectively. The first and second gear trains are schematically represented in FIG. 1. In turn, the gear trains 116, 118 are rotationally coupled to the drive wheels 120 and 122 respectively. Each of the gear trains 116, 118 may have one or more gears, shafts, and/or other mechanical components for transferring mechanical power from the respective electric machine to the corresponding drive wheel.

A disconnect clutch 124 is further included in the electric drive unit 104. The disconnect clutch 124 is configured to selectively rotationally couple the first electric machine 106 and the second electric machine 108. In this way, torque is able to be selectively transferred between the electric machines 106, 108. Further, a park lock assembly 126 (schematically depicted in FIG. 1) is included in the electric drive unit 104. The park lock assembly 126 includes a parking gear and a parking gear engagement device that inhibits rotational movement of the parking gear when engaged. Further, in the illustrated example, the park lock assembly 126 is positioned inboard of the electric machines 106, 108. However, the park lock assembly 126 may be positioned in different suitable locations, as elaborated upon herein. Still further, in the example illustrated in FIG. 1, the electric machines, gear trains, disconnect clutch, park lock assembly, and drive wheels are generally coaxially arranged. However, other layouts are possible which are expanded upon herein with regard to FIGS. 2-3.

Another disconnect clutch 127 may be included in the gear train 116. Likewise, yet another disconnect clutch 129 may be included in the gear train 118. The disconnect clutch 127 is configured to permit and inhibit mechanical power transfer through the gear train 116 to the drive wheel 120. Likewise, the disconnect clutch 129 is configured to permit and inhibit mechanical power transfer through the gear train 118 to the drive wheel 122.

Figure 2:
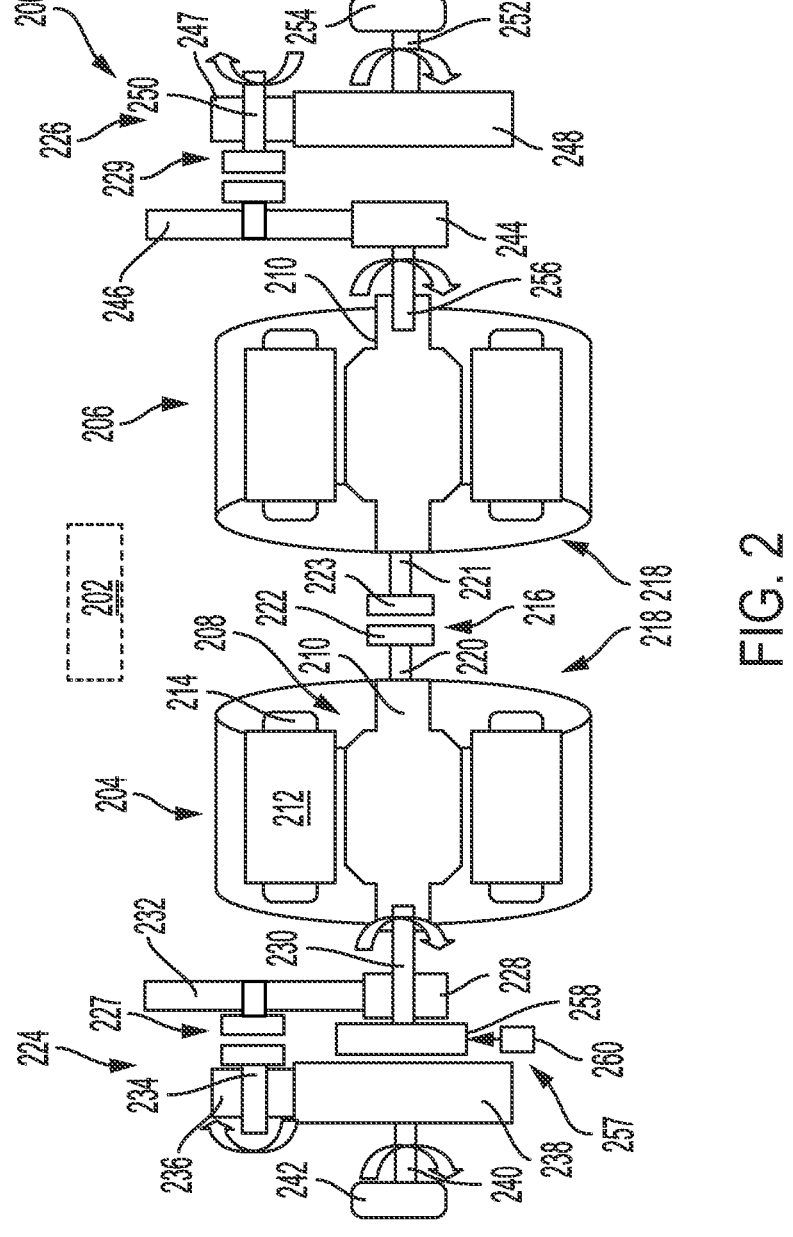
FIGS. 2-3 show different example architectures of electric drive units with multiple electric machines.
Figures 3, 6:
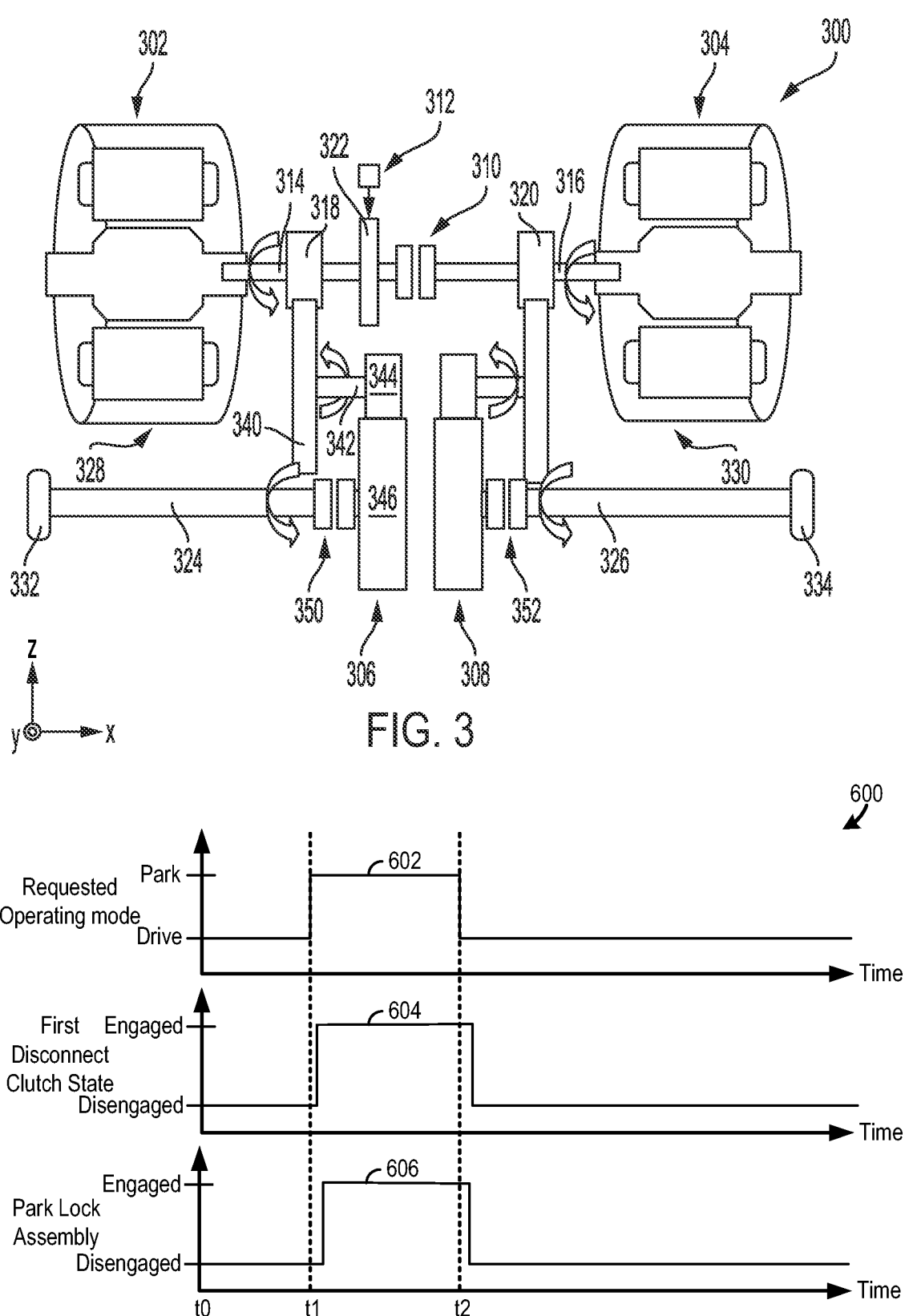
FIGS. 6 and 7 show timing diagrams related to an exemplary electric drive unit control schemes.

It will be understood that the layout of the electric machines 106, 108, the gear trains 116, 118, the disconnect clutches 124, 127, and 129, and the park lock assembly 126 has greater complexity than is expressed in the schematic depiction of the electric drive unit 104 illustrated in FIG. 1. Different potential electric drive unit architectures as shown in FIGS. 2-3 and discussed in greater detail herein.

The EV 100 may further include a control system 190 with a controller 191, as shown in FIG. 1. The controller 191 may include a microcomputer with components such as a processor 192 (e.g., a microprocessor unit), input/output ports, an electronic storage medium 194 for executable programs and calibration values (e.g., a read-only memory chip, random access memory, keep alive memory, a data bus, and the like). The storage medium may be programmed with computer readable data representing instructions that are executable by the processor for performing the methods and control techniques described herein as well as other variants that are anticipated but not specifically listed. As such, the control techniques, schemes, methods, and the like expanded upon herein may be stored as instructions in non-transitory memory.

The controller 191 may receive various signals from sensors 195 coupled to various regions of the EV 100. For example, the sensors 195 may include a pedal position sensor designed to detect a depression of an operator-actuated pedal such as an accelerator pedal and/or a brake pedal, a drive mode selector sensor, clutch position sensors, speed sensor(s), electric machine speed sensors, an ambient temperature sensor, an ambient pressure sensor, and the like. The clutch position sensors may be coupled to the clutches which each provide a signal indicative of clutch state (e.g., engaged or disengaged).

An input device 198 (e.g., accelerator pedal, brake pedal, drive mode selector, combinations thereof, and the like) may further provide input signals indicative of an operator's intent for system control. To elaborate, the input device may include a drive mode selector that allows an operator to select a drive mode (e.g., a forward or reverse drive mode) or a park mode. As such, the input device may send a signal to the controller which indicates an operator's intent for the electric drive unit's current operating mode (e.g., park or drive).

Upon receiving the signals from the various sensors 195 of FIG. 1, the controller 191 processes the received signals, and employs various actuators 196 of system components to adjust the components based on the received signals and instructions stored on the memory of controller 191. For example, the controller 191 may adjust the speed of the electric machine 106 via adjustment of the inverter 110, for instance. For instance, the controller 191 may determine that the electric machine's speed should be adjusted and responsive to such a determination the controller may send a command to the inverter to adjust electric machine speed. The other controllable components (e.g., the disconnect clutches 124, 127, and 129, the park lock assembly 126, etc.) in the system may function in a similar manner with regard to sensor signals, control commands, and actuator adjustment, for example. The control system 190 with the controller 191 may be utilized in the other electric drive units described herein. Further, the controller may be used to execute the methods, control schemes, and the like described herein via instructions stored in memory that are executable via a processor.

FIGS. 1-3 include a coordinate system to orient the views. The z-axis may be a vertical axis (e.g., parallel to a gravitational axis), the y-axis may be a longitudinal axis (e.g., horizontal axis), and/or the x-axis may be a lateral axis, in one example. However, the axes may have other orientations, in other examples.

FIG. 2 shows a more detailed example of an electric drive unit 200. The electric drive unit 200 is specifically depicted as an electric drive axle where the electric machines, gear trains, and associated components form an integrated axle unit. However, in other examples, the electric machines or other components in the drive unit may be spaced away from the drive axle assembly. The electric drive unit 200 shown in FIG. 2 may include structural and/or functional features from the electric drive unit 104 depicted in FIG. 1 as well as one or more of the other electric drive units described herein and vice versa.

In the electric drive axle example, the drive axle may specifically be an electric beam axle. A beam axle is an axle with mechanical components structurally supporting one another and extending between drive wheels. For instance, the beam axle may be a structurally continuous structure that spans the drive wheels on a lateral axis, in one embodiment. Thus, wheels coupled to the beam axle substantially move in unison when articulating, during, for example, vehicle travel on uneven road surfaces. To elaborate, the camber angle of the wheels may remain substantially constant as the suspension moves through its travel. The beam axle may be coupled to a dependent suspension system 202 (schematically depicted in FIG. 2), in one example. Therefore, the electric axle may be an unsprung mass.

The electric drive unit 200 again includes a first electric machine 204 and a second electric machine 206. Each of the electric machines include a rotor 208 with a rotor shaft 210, and a stator 212 which may include end windings 214. The electric machines 204, 206 are similar in size and construction, in the illustrated example. To elaborate, the electric machines 204, 206 may be similar in design except for the arrangements of internal components of the stator and the rotor to achieve the layout goals and keep the left and right shafts in the same axis.

In the illustrated example, a disconnect clutch 216 (e.g., a first disconnect clutch) is axially positioned between inboard sides 218 of the electric machines 204, 206. To elaborate, rotor shaft extensions 220, 221 from the electric machines 204, 206 are rotationally coupled to opposing engageable components 222, 223 in the disconnect clutch 216. The engageable components may be toothed faces of the clutch, plate carriers and/or drums, etc. Thus, the disconnect clutch 216 as well as the other disconnect clutches described herein may be dog clutches, synchronizers, and/or friction clutches (e.g., wet friction clutches). The disconnect clutch 216 may also be an electromagnetically actuated clutch configured to, during clutch engagement and disengagement, align shaft speed via a control scheme that facilitates smooth operation of the engaging and disengaging function of clutch which decreases the chance of improper engagement and clutch degradation. The rotor shaft extensions 220, 221 and the other rotor shaft extensions described herein may be removably or fixedly coupled to the rotor shafts or formed therewith.

Gear trains 224, 226 are rotationally coupled to the electric machines 204, 206 respectively. The gear trains are similar in size and construction, in the illustrated example. However, gear trains of varying sizes and/or layouts may be used in other examples. The gear train 224 includes a gear 228 that is fixedly coupled to a rotor shaft extension 230 such that it rotates therewith. The gear 228 meshes with a gear 232 that is coupled to an intermediate shaft 234 such that it rotates therewith. The gears 228 and 232 form a first stage. In the illustrated example, the gear train 224 (as well as the gear train 226) includes two stages. However, it will be understood that the gear trains may include a single stage or more than two stages in other embodiments. The number of gear train stages may be selected based on the size and construction of the electric machines, vehicle weight, vehicle performance targets, and the like.

Further, in the illustrated example, the gear trains 224, 226 are depicted as single speed gear trains which may reduce the complexity and size of the gear trains when compared to multi-speed gear trains. However, in other examples, the gear trains may be multi-speed gear trains with clutches, for instance. To elaborate, the gear trains may be designed as multi-speed gear trains with one or more clutches which may however increase gear train complexity. In the multi-speed gear train example, the electric machines may have less continuous maximum power generation capabilities.

Another gear 236 is coupled to the intermediate shaft 234 such that it rotates therewith. The gear 236 meshes with a gear 238 on an output shaft 240. The gear 238 is coupled to the output shaft 240 such that it rotates therewith. The term output is used to refer to the direction of mechanical power flow when the electric drive unit is in a drive mode (e.g., a forward or reverse drive mode). However, it will be understood that during other modes such as regeneration, mechanical power flows in the opposite direction.

Another disconnect clutch 227 (e.g., a second disconnect clutch) may be included in the gear train 224. Likewise, yet another disconnect clutch 229 (e.g., a third disconnect clutch) may be included in the gear train 226. The disconnect clutch 227 is configured to permit and inhibit mechanical power transfer through the gear train 224 to a drive wheel 242. Likewise, the disconnect clutch 229 is configured to permit and inhibit mechanical power transfer through the gear train 226 to a drive wheel 254. In the illustrated example, the clutch 227 is specifically coupled to the intermediate shaft 234 between the gear 232 and the gear 236. Likewise, in the illustrated example, the clutch 229 is specifically coupled to shaft 250 between the gear 232 and the gear 236. However, the clutch 227 and/or the clutch 229 may be positioned in alternate location(s). For instance, the clutch 227 may be positioned on the shaft 230 or 240 and the clutch 229 may be positioned on the mirrored shaft in the gear train 226, in other examples.

The output shaft 240 is rotationally coupled (e.g., directly rotationally coupled) to the drive wheel 242. The gear train 226 similarly includes gears 244, 246, 247, and 248, an intermediate shaft 250, and an output shaft 252. The output shaft 252 is also rotationally coupled to the drive wheel 254. Further, the gear 244 is coupled to a rotor shaft extension 256 of the rotor shaft 210 such that it rotates therewith. These rotor shaft extensions may or may not be included in the gear trains. Further, the gear train 226 has a mirrored arrangement with regard to the gear train 224.

The electric drive unit 200 further includes a park lock assembly 257 with a parking gear 258. In the illustrated example, the parking gear 258 is rotationally coupled to the rotor shaft extension 230. To elaborate, the parking gear 258 is rotationally coupled to the rotor shaft extension outboard of the gear 228. Alternatively, the parking gear 258 may be positioned inboard of the gear 228.

A parking gear engagement device 260 (e.g., a parking pawl and/or other suitable device) may be used to selectively engage the parking gear 258. Thus, the parking gear 258 may be engaged and disengaged based on the operating mode of the electric drive unit. For instance, the parking gear 258 may be engaged when the electric drive unit 200 is in a park mode and disengaged when the electric drive unit is in a drive mode. The control strategies for the park lock and drive modes are expanded upon herein with regard to FIGS. 4-6. The parking gear engagement device 260 may be electro-mechanically controlled in one example. However, in other examples the parking gear engagement device 260 hydraulically and/or pneumatically operated.

In the illustrated example, the rotor shafts 210, rotor shaft extensions 220, 221, 230, and 256, the output shafts 240, 252, and the disconnect clutch 216 are coaxially positioned. This coaxial layout may be desirable for certain vehicle platforms. However, other arrangements are possible which are expanded upon herein with regard to FIG. 3.

The electric powertrain architectures illustrated in FIGS. 2-3 may be used for light vehicle and light commercial vehicle applications, were as electric drive units with park lock used in the front axle of the vehicle, in one use-case example. Continuing with this example, park lock may be omitted from the drive unit in the rear axle. Therefore, using this combination of electric drive units in one vehicle enables the vehicle to achieve four-wheel drive functionality in an all-electric vehicle, in one specific use-case example. Further, in other examples, the drive units depicted in FIGS. 2-3 may be used in combination with an internal combustion engine for hybrid vehicles.

FIG. 3 shows another example of an electric drive unit 300 (e.g., an electric axle). The electric drive unit 300 again includes electric machines 302 and 304, gear trains 306 and 308, a disconnect clutch 310, and a park lock assembly 312. However, in the example illustrated in FIG. 3, all of those components are positioned axially inboard of the electric machines 302, 304. This allows the axial width of the drive unit to be decreased and the drop to be increased which may be desirable in certain vehicles.

A rotor shaft extension 314 extends in an inboard direction from the electric machine 302 and another rotor shaft extension 316 likewise extends in an inboard direction from the electric machine 304. The rotor shaft extensions 314, 316 each have gears 318, 320 coupled thereto respectively, such that they rotate therewith.

The disconnect clutch 310 is coupled to the rotor shaft extensions 314, 316 similar to the electric drive unit 200, depicted in FIG. 2. Therefore, redundant description of the disconnect clutch is omitted for brevity.

A parking gear 322 in the park lock assembly 312 is coupled to the rotor shaft extension 314 between the gear 318 and the disconnect clutch 310, in the illustrated example. Output shafts 324, 326 may extend along sides 328, 330, respectively of the electric machines 302, 304 to allow the drive wheels 332, 334 to be positioned axially outboard of the electric machines. However, alternate output shaft sizing is possible.

The gear train 306 further includes a gear 340 that meshes with the gear 318. The gear 340 is coupled to an intermediate shaft 342 which has another gear 344 coupled thereto. The gear 344 meshes with gear 346 which is coupled to the shaft 324. The gear train 308 includes a mirrored gear and shaft arrangement, in the illustrated example. The gears in each of the gear trains 306 and 308 are positioned between the electric machines 302 and 304 in relation to the x-axis, in the illustrated example. In this way, the lateral compactness of the electric drive is increased. However, other gear train architectures are possible.

Another disconnect clutch 350 may be included in the gear train 306. Likewise, yet another disconnect clutch 352 may be included in the gear train 308. The disconnect clutch 350 is configured to permit and inhibit mechanical power transfer through the gear train 306 to a drive wheel 332. Likewise, the disconnect clutch 352 is configured to permit and inhibit mechanical power transfer through the gear train 308 to a drive wheel 334. In the illustrated example, the clutch 350 is specifically coupled to the shaft 324 and the clutch 352 is coupled to the shaft 326. However, the clutch 350 and/or the clutch 352 may be positioned in alternate location(s).

FIG. 4 shows a table 400 which illustrates different possible operating states of the electric drive unit 200 depicted in FIG. 2. However, it will be appreciated that the control schemes denoted in the table may be applied to the other electric drive units or combinations of the electric drive units described herein.

One of the columns indicates the drive unit's operating mode (i.e., drive mode (a), drive mode (b), drive mode (c), drive mode (d), or park mode). The next column indicates the operational state of the disconnect clutch 216 (i.e., "engaged" or "disengaged"). The next column indicates the operation state of the disconnect clutch 227 (i.e., "engaged" or "disengaged"). The next column indicates the operation state of the disconnect clutch 229 (i.e., "engaged" or "disengaged").

The next column indicates the operational state of the park lock assembly (i.e., "engaged" or "disengaged"). The next column indicates the operational state of the left drive sub-system which includes one of the electric machines and one of the gear trains. The next column indicates the operational state of the right drive sub-system which includes the other electric machine and gear train. The next column indicates an exemplary drive condition which may be occurring.

In drive mode (a), both left and right drive sub-systems are in drive and the disconnect clutch is engaged while the park lock assembly is disengaged. The operating conditions under which the drive mode (a) may be implemented include, but are not limited to, a hill climb, a low traction condition, vehicle launch, and the like.

In drive mode (b), both left and right drive sub-systems are in drive and the disconnect clutch is disengaged while the park lock assembly is disengaged. The operating conditions under which the drive mode (b) may be implemented include, but are not limited to, a cornering condition where there is a variance in drive wheel speed (from left to right).

In drive mode (c), all of the disconnect clutches are engaged and the park lock assembly is disengaged and one of the electric machines is operated in a drive mode while the other electric machine is operated as a generator. Drive mode (c) may be implemented when load sharing is desired and under a cruising condition and a straight driving condition, for instance.

In drive mode (d), all of the disconnect clutches are disengaged and the park lock assembly is disengaged. Drive mode (d) may be implemented during an overspeed condition such as when the vehicle is on a downhill slope.

In the park mode, both left and right drive sub-systems are in park and the disconnect clutch is engaged while the park lock assembly is engaged. The operating conditions under which the park mode may be implemented include, but are not limited to, a null speed condition of the vehicle where a drive mode selector has been moved into park via the vehicle operator, for instance.

Figure 5:
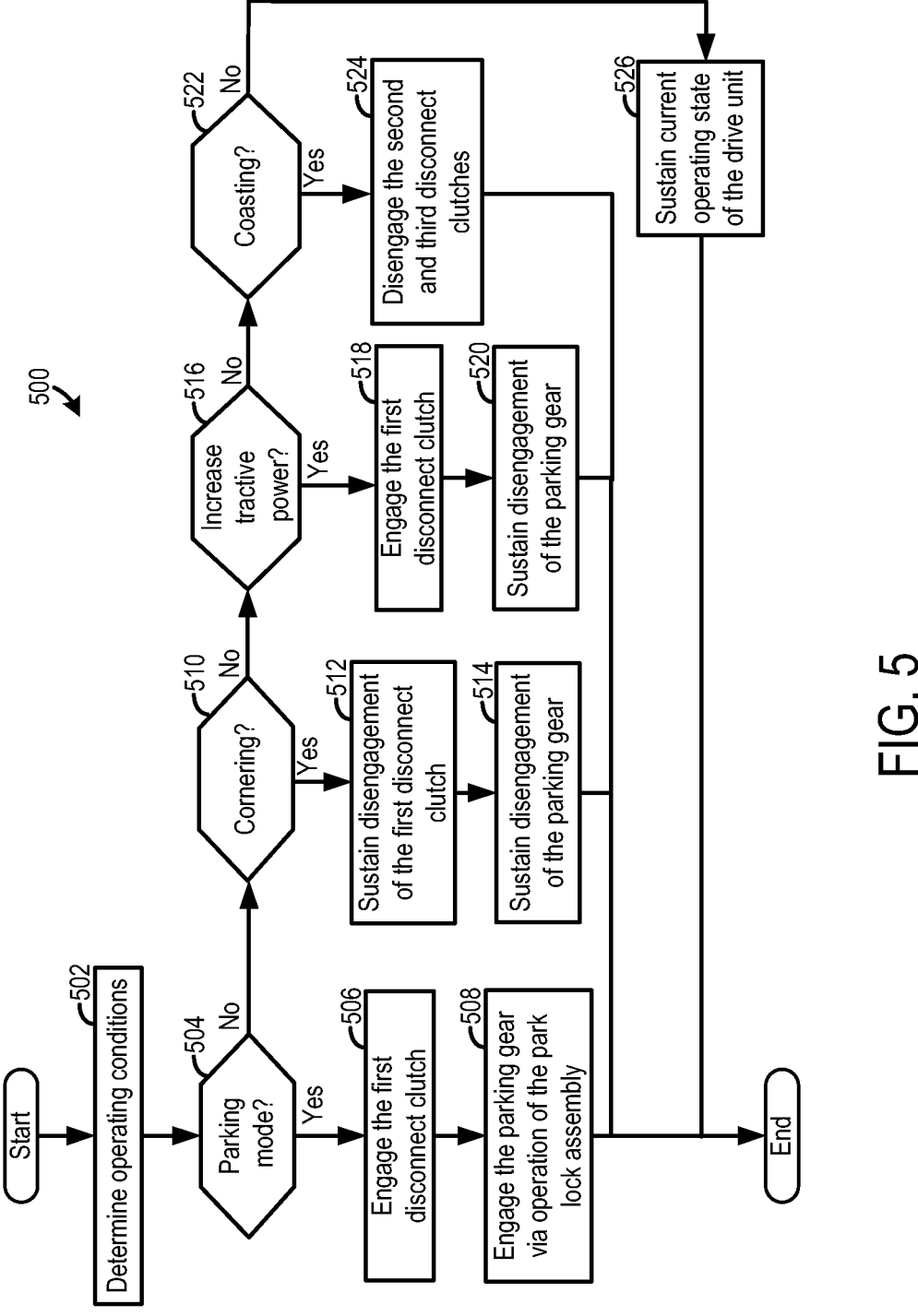
FIG. 5 shows a method for operation of an electric drive unit.

FIG. 5 shows a method 500 for operation of an electric drive unit. The method 500 as well as the other control schemes, control techniques, methods, etc. described herein may be implemented via any of the electric drive units or combinations of the electric drive units described herein. However, in other examples, the control schemes and/or the other control techniques, methods, etc. described herein may be implemented by other suitable electric drive units.

At 502, the control method includes determining operating conditions. The operating conditions may include a drive mode selector state (e.g., "forward drive", "reverse drive", and "park"), vehicle speed, electric machine speeds, clutch state, park lock assembly state, and the like. These operating conditions may be ascertained via sensor inputs, modelling, etc.

At 504, the method includes determining if a parking mode had been selected. The parking may be selected via vehicle operator via interaction with a drive mode selector, in one example, or automatically selected via a control algorithm, in another example. Thus, in one example, the determination at 504 may be ascertained via sensor inputs from a sensor which is coupled to a drive mode selector, in one example.

If it is determined that the parking mode has been selected (YES at 504) the method moves to 506 where the method includes engaging the first disconnect clutch. Next at 508, the method includes engaging the park lock assembly. To elaborate, the entry condition for engaging the park lock assembly may be a null vehicle (e.g., gear train) speed. It will be understood that at 502 and 504 the disconnect clutch and the park lock assembly may be in a disengaged state. However, in another example, the disconnect clutch may be engaged at step 502 and/or step 504. In such an example, the method may alternatively include at 506 sustaining engagement of the disconnect clutch.

If it is determined that the parking mode has not been selected (NO at 504) the method moves to 510. At 510, the method includes determining if the vehicle is experiencing or anticipated to experience a cornering condition where there is a left to right wheel speed variance.

If it is determined that the vehicle is experiencing a cornering condition (YES at 510) the method moves to 512. At 512, the method includes sustaining disengagement of the first disconnect clutch. Next at 514, the method includes sustaining disengagement of the park lock assembly.

Conversely, if it is determined that the vehicle is not experiencing a cornering condition (NO at 510) the method moves to 516. At 516, the method includes determining if the drive unit's tractive power should be increased. The tractive power may be increased during a hill climb condition, launch, etc.

If it is determined that the tractive power should be increased (YES at 516), the method moves to 518 where the method includes engaging the first disconnect clutch. Next at 520, the method includes sustaining disengagement of the park lock system.

On the other hand, if it is determined that the tractive power should not be increased (NO at 516) the method moves to 522 where the method includes determining if the vehicle is coasting. To elaborate, the method may determine if the vehicle is experiencing an overspeeding condition caused by the vehicle driving on a downhill slope. Such a determination may use speed sensors at the drive wheels and the electric machines to make the determination. If it is determined that vehicle is coasting (YES at 522) the method moves to 524 where the method includes disengaging the second and third disconnect clutches. In this way, electric machine overspeeding is discontinued or avoided, thereby discontinuing or avoiding back EMF generation and reducing the chance of electric machine degradation. If it is determined that vehicle is not coasting (NO at 522) the method moves to 526 where the method includes sustaining the electric drive unit's current operating state. Method 500 allows the park lock in the drive unit to be efficiently engaged while also adapting the unit's tractive performance to suit the current operating conditions.

FIG. 6 illustrates a timing diagram 600 of a use-case operating scenario for an electric drive unit, such as any of the previously described electric drive units, combinations of the electric drive units, or other suitable electric drive units. In each graph, time is indicated on the abscissa and increases from left to right. The ordinate for plot 602 indicates the requested operating mode of the electric drive unit. The ordinate for plot 604 indicates the configuration (i.e., "engaged" or "disengaged") of the disconnect clutch. The ordinate for plot 606 indicates the configuration (i.e., "engaged" or "disengaged") of the park lock assembly.

At t1, a park mode is requested. For instance, a vehicle operator may move a drive mode selector into a park position. Responsive to selection of the park mode, the disconnect clutch is engaged and then the park lock assembly is engaged.

At t2, the drive mode is requested. Responsive to selection of the drive mode, the park lock assembly is disengaged and then the disconnect clutch is subsequently disengaged. However, in other examples, the engagement of the disconnect clutch may be sustained. It will be understood that the disconnect clutch may be engaged and disengaged while the electric drive unit is operating in a drive mode depending on the operating conditions of the unit.

Figure 7:
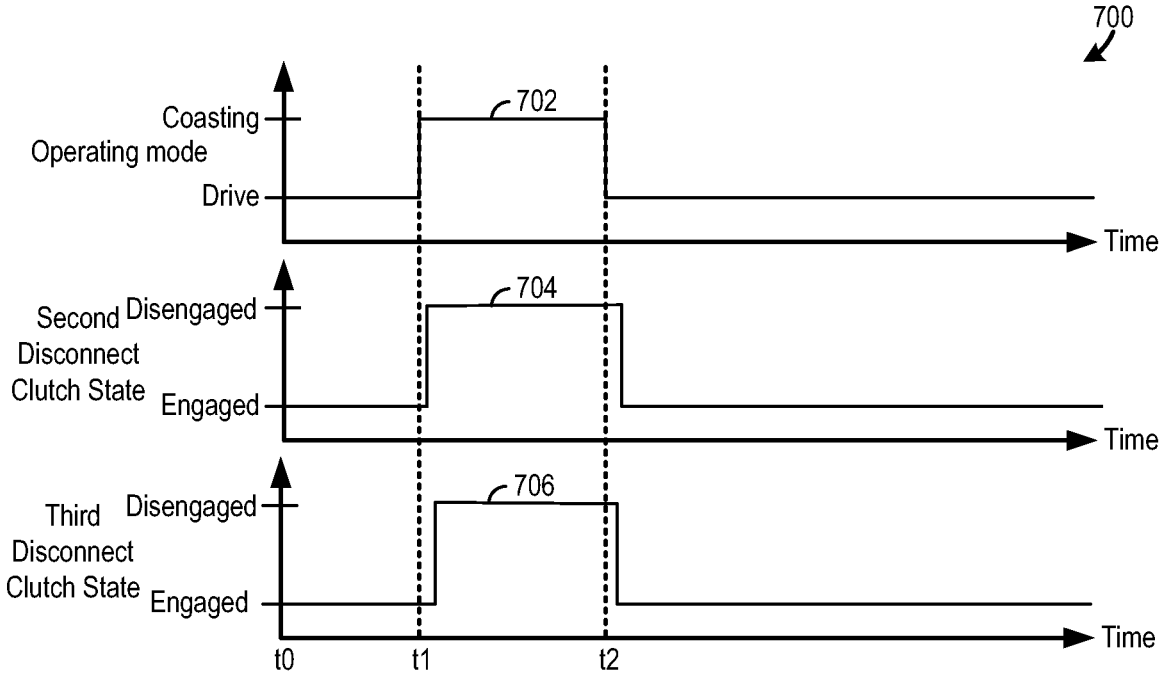

FIG. 7 illustrates a timing diagram 700 of a use-case operating scenario for an electric drive unit, such as any of the previously described electric drive units, combinations of the electric drive units, or other suitable electric drive units. In each graph, time is indicated on the abscissa and increases from left to right. The ordinate for plot 702 indicates the operating mode of the electric drive unit. The ordinate for plot 704 indicates the configuration (i.e., "engaged" or "disengaged") of the second disconnect clutch. The ordinate for plot 706 indicates the configuration (i.e., "engaged" or "disengaged") of the third disconnect clutch. It will be understood that the second and third disconnect clutches are designed to inhibit mechanical power transfer from the drive wheels to the electric machines.

At t1, the vehicle transitions from a drive condition to a coasting condition. For instance, a vehicle operator release pressure from an accelerator pedal while the vehicle is on a downhill slope. Responsive to entry into the coasting condition, the second and third disconnect clutches are disengaged.

At t2, the vehicle transitions back to the drive condition from the coasting condition. Responsive to this transition, the second and third disconnect clutches are again engaged. In this way, excess back EMF generation during coasting is reduced or avoided, thereby reducing the chance of electric machine degradation.

The technical effect of the electric drive unit operating methods described herein is to efficiently implement park lock engagement via one unit that is integrated into one of the gear trains and increase the drive unit's performance during a drive mode by selectively engaging the first disconnect clutch. Another technical effect of the drive unit operating methods described herein is to reduce the amount of back EMF generation in the electric machines by disengaging the second and third disconnect clutches during coasting, for instance.

FIGS. 1-3 show example component configurations with relative positioning of the various components. If elements are shown directly contacting each other, or directly coupled to one another, then such elements may be referred to as directly contacting or directly coupled to one another, respectively, at least in one example. Similarly, elements shown contiguous or adjacent to one another may be referred to as contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements coaxial with one another may be referred to as such, in one example. Further, elements shown intersecting one another may be referred to as intersecting elements or intersecting one another, in at least one example. Further still, an element shown within another element or shown outside of another element may be referred to as such, in one example. In other examples, elements offset from one another may be referred to as such. Even further, elements which are coaxial or parallel to one another may be referred to as such. Still further, an axis about which a component rotates may be referred to as a rotational axis.

The invention will be further described in the following paragraphs. In one aspect, an electric drive unit is provided that comprises a first electric machine rotationally coupled to a first drive wheel via a first gear train; a second electric machine rotationally coupled to a second drive wheel via a second gear train; a first disconnect clutch configured to, in an engaged configuration, rotationally couple the first electric machine and the second electric machine; a controller including instructions stored in memory that when executed, during a first operating condition, cause the controller to: engage the first disconnect clutch; and operate one of the first and second electric machines in a generator mode while the other electric machine is operated in a drive mode. In one example, the electric drive unit further comprises a second disconnect clutch positioned in the first gear train; and a third disconnect clutch positioned in the second gear train. In another example, the controller may include instructions that when executed, during an overspeed condition, cause the controller to: disengage the second disconnect clutch and the third disconnect clutch. In another example, the electric drive unit further comprises a park lock assembly coupled to one of the first gear train and the second gear train and configured to inhibit rotation of the corresponding gear train. In one example, the controller may include instructions that when executed, during a null speed condition, cause the controller to: engage the first disconnect clutch and the park lock assembly. In another example, the controller may include instructions that when executed, during a cornering condition, cause the controller to: disengage the first disconnect clutch. In one example, the controller may include instructions that when executed, during a second operating condition, cause the controller to: engage the first disconnect clutch; and operate the first electric machine and the second electric machine in a drive mode. In another example, the disconnect clutch may be directly rotationally coupled to a first rotor shaft of the first electric machine and a second rotor shaft of the second electric machine. In one example, the park lock assembly may include a parking gear that is coupled for rotation with a rotor shaft extension of the first electric machine or the second electric machine.

In yet another aspect, a method for operation of an electric drive unit is provided that comprises engaging or sustaining engagement of a first disconnect clutch, a second disconnect clutch, and a third disconnect clutch; and operating a first electric machine in a drive mode while a second electric machine receives mechanical power from the first electric machine and is operated in a generator mode; wherein the electric drive unit comprises: the first electric machine rotationally coupled to a first drive wheel via a first gear train; the second electric machine rotationally coupled to a second drive wheel via a second gear train; the first disconnect clutch selectively rotationally coupled the first electric machine and the second electric machine; the second disconnect clutch positioned in the first gear train; and the third disconnect clutch positioned in the second gear train. In one example, the method may further comprise disconnecting the second disconnect clutch and the third disconnect clutch during an overspeed condition. In one example, the electric drive unit may further comprise: a park lock assembly coupled to one of the first gear train and the second gear train and configured to inhibit rotation of the corresponding gear train. In another example, the method may further comprise, during a null speed condition: engaging or sustaining engagement of the first disconnect clutch, the second disconnect clutch, and the third disconnect clutch; and engaging the park lock assembly.

In yet another example, an electric axle is provided that comprises: a first electric machine rotationally coupled to a first drive wheel via a first gear train; a second electric machine rotationally coupled to a second drive wheel via a second gear train; a first disconnect clutch configured to, in an engaged configuration, rotationally couple the first electric machine and the second electric machine; a second disconnect clutch positioned in the first gear train; and a third disconnect clutch positioned in the second gear train. In one example, the electric axle may further comprise a controller including instructions stored in memory that when executed, during a coasting condition, cause the controller to: disengage the second disconnect clutch and the third disconnect clutch. In another example, the electric axle may further comprise a controller including instructions stored in memory that when executed, during a first operating condition, cause the controller to: engage the first disconnect clutch; and operate one of the first and second electric machines in a generator mode while the other electric machine is operated in a drive mode. In yet another example, electric axle may further comprise a controller includes instructions that when executed, during a second operating condition, cause the controller to: engage the first disconnect clutch; and operate the first electric machine and the second electric machine in a drive mode. In one example, the disconnect clutch may be directly rotationally coupled to a first rotor shaft of the first electric machine and a second rotor shaft of the second electric machine. In another example, the electric axle may further comprise a park lock assembly that includes a parking gear that is coupled for rotation with a rotor shaft extension of the first electric machine or the second electric machine. In one example, the electric axle further comprises a controller includes instructions that when executed, during a cornering condition, cause the controller to: disengage the first disconnect clutch.

In another representation, an electric drive beam axle is provided that includes mirrored drives which each include a traction motor and a single speed gear train with a wheel disconnect clutch, wherein the electric drive beam axle includes a locking clutch configured to selective lock joint rotation of the traction motors and a park lock that arrests motion of one of the single speed gear trains.

Note that the example control and estimation routines included herein can be used with various electric drive configurations. The control methods and routines disclosed herein may be stored as executable instructions in non-transitory memory and may be carried out by the control system including the controller in combination with the various sensors, actuators, and other system hardware in combination with the electronic controller. As such, the described actions, operations, and/or functions may graphically represent code to be programmed into non-transitory memory of the computer readable storage medium in the vehicle and/or powertrain control system. The various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of traction motors, internal combustion engines in some instances, and the like. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric drive unit, comprising:
a first electric machine rotationally coupled to a first drive wheel via a first gear train;
a second electric machine rotationally coupled to a second drive wheel via a second gear train;
a first disconnect clutch configured to, in an engaged configuration, rotationally couple the first electric machine and the second electric machine;
a park lock assembly coupled to one of the first gear train and the second gear train and configured to inhibit rotation of the corresponding gear train;
a controller including instructions stored in memory that when executed, during a first operating condition, cause the controller to:
engage the first disconnect clutch; and
operate one of the first and second electric machines in a generator mode while the other electric machine is operated in a drive mode, and
wherein the controller further includes instructions that when executed, during a null speed condition, cause the controller to:
engage the first disconnect clutch and the park lock assembly.

2. The electric drive unit of claim 1, further comprising:
a second disconnect clutch positioned in the first gear train; and
a third disconnect clutch positioned in the second gear train.

3. The electric drive unit of claim 1, wherein the controller includes instructions that when executed, during a cornering condition, cause the controller to:
disengage the first disconnect clutch.

4. The electric drive unit of claim 1, wherein the controller includes instructions that when executed, during a second operating condition, cause the controller to:
engage the first disconnect clutch; and
operate the first electric machine and the second electric machine in the drive mode.

5. The electric drive unit of claim 1, wherein the first disconnect clutch is directly rotationally coupled to a first rotor shaft of the first electric machine and a second rotor shaft of the second electric machine.

6. The electric drive unit of claim 1, wherein the park lock assembly includes a parking gear that is coupled for rotation with a rotor shaft extension of the first electric machine or the second electric machine.

7. A method for operation of an electric drive unit, comprising:

engaging or sustaining engagement of a first disconnect clutch, a second disconnect clutch, and a third disconnect clutch;

operating a first electric machine in a drive mode while a second electric machine receives mechanical power from the first electric machine and is operated in a generator mode; and disconnecting the second disconnect clutch and the third disconnect clutch during an overspeed condition;

the first electric machine of the electric drive unit rotationally coupling a first drive wheel via a first gear train;

the second electric machine of the electric drive unit rotationally coupling a second drive wheel via a second gear train; and the first disconnect clutch of the electric drive unit selectively rotationally coupling the first electric machine and the second electric machine, wherein the second disconnect clutch of the electric drive unit is positioned in the first gear train, and wherein the third disconnect clutch of the electric drive unit is positioned in the second gear train.

8. The method of claim 7, where the electric drive unit further comprises:

a park lock assembly coupled to one of the first gear train and the second gear train and configured to inhibit rotation of the corresponding gear train.

9. The method of claim 8, further comprising, during a null speed condition:

engaging or sustaining engagement of the first disconnect clutch, the second disconnect clutch, and the third disconnect clutch; and engaging the park lock assembly.

10. An electric axle, comprising:

a first electric machine rotationally coupled to a first drive wheel via a first gear train;

a second electric machine rotationally coupled to a second drive wheel via a second gear train;

a first disconnect clutch configured to, in an engaged configuration, rotationally couple the first electric machine and the second electric machine;

a second disconnect clutch positioned in the first gear train;

a third disconnect clutch positioned in the second gear train; and a controller including instructions stored in memory that when executed, during a coasting condition, cause the controller to:

disengage the second disconnect clutch and the third disconnect clutch.

11. The electric axle of claim 10, the controller including instructions stored in memory that when executed, during a first operating condition, cause the controller to:

engage the first disconnect clutch; and operate one of the first and second electric machines in a generator mode while the other electric machine is operated in a drive mode.

12. The electric axle of claim 11, the controller including instructions that when executed, during a second operating condition, cause the controller to:

engage the first disconnect clutch; and operate the first electric machine and the second electric machine in the drive mode.

13. The electric axle of claim 10, wherein the first disconnect clutch is directly rotationally coupled to a first rotor shaft of the first electric machine and a second rotor shaft of the second electric machine.

14. The electric axle of claim 13, further comprising a park lock assembly that includes a parking gear that is coupled for rotation with a rotor shaft extension of the first electric machine or the second electric machine.

15. The electric axle of claim 10, the controller including instructions that when executed, during a cornering condition, cause the controller to:

disengage the first disconnect clutch.

* * * * *